(12) United States Patent
Furutani et al.

(10) Patent No.: US 9,111,210 B2
(45) Date of Patent: *Aug. 18, 2015

(54) INFORMATION PROCESSING APPARATUS AND JOB SETTING METHOD

(71) Applicant: KYOCERA Document Solutions Inc., Osaka-shi, Osaka (JP)

(72) Inventors: Hiroshi Furutani, Osaka (JP); Tetsuya Maeda, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/470,651

(22) Filed: Aug. 27, 2014

(65) Prior Publication Data

US 2015/0062616 A1 Mar. 5, 2015

(30) Foreign Application Priority Data

Aug. 30, 2013 (JP) ................................. 2013-180701

(51) Int. Cl.
*G06F 3/12* (2006.01)
*G06K 15/00* (2006.01)

(52) U.S. Cl.
CPC .................................. *G06K 15/4095* (2013.01)

(58) Field of Classification Search
CPC ......... G06F 3/1222; G06F 21/31; G06F 9/50; G06F 21/335; G06F 21/51; G06F 3/04842; G06F 17/30011; H04N 1/00278; H04N 1/4413; H04N 2201/0094; H04N 1/00204; H04N 1/00233; H04N 1/107; H04N 1/387

USPC .................... 358/1.14, 1.15, 1.13, 1.18, 473; 382/115, 103, 112, 116, 118, 137
See application file for complete search history.

(56) References Cited

U.S. PATENT DOCUMENTS

| | | | |
|---|---|---|---|
| 8,505,089 B2 * | 8/2013 | Maeda et al. .................... | 726/17 |
| 8,625,131 B2 * | 1/2014 | Matsugashita ............... | 358/1.15 |
| 2004/0181662 A1 * | 9/2004 | Kanai et al. .................... | 713/155 |
| 2008/0307510 A1 * | 12/2008 | Sakakibara ....................... | 726/4 |
| 2010/0250357 A1 * | 9/2010 | Kim ........................... | 705/14.23 |
| 2010/0268833 A1 * | 10/2010 | Nakayama .................... | 709/228 |
| 2012/0167201 A1 | 6/2012 | Maeda et al. | |
| 2014/0229387 A1 * | 8/2014 | Chow .............................. | 705/71 |
| 2014/0233053 A1 * | 8/2014 | Kakutani ..................... | 358/1.14 |
| 2015/0062615 A1 * | 3/2015 | Furutani et al. .............. | 358/1.14 |
| 2015/0062636 A1 * | 3/2015 | Kanbayashi ................. | 358/1.15 |

FOREIGN PATENT DOCUMENTS

JP 2012137968 A 7/2012

* cited by examiner

*Primary Examiner* — Negussie Worku
(74) *Attorney, Agent, or Firm* — Alleman Hall McCoy Russell & Tuttle LLP

(57) ABSTRACT

In an information processing apparatus, if the number of specific items of a plurality of setting items included in pre-registration information selected by a selection portion is equal to or less than a threshold, a change portion changes a setting content of the specific item to a content within a range of use authority. A setting screen display portion displays a setting screen for setting the specific item whose setting content has been changed by the change portion. A second display control portion displays an authentication screen if the setting content of the specific item is set on the setting screen so as to be outside the range of the use authority.

6 Claims, 11 Drawing Sheets

| D30 PRESENCE/ ABSENCE OF SETTING PROHIBITION OF COPY PROCESS | CONTENT OF SETTING PROHIBITION OF COPY PROCESS | | | |
|---|---|---|---|---|
| | COLOR SETTING | PAPER SETTING | AGGREGATION SETTING | ECO-PRINT SETTING |
| USER A | ABSENCE | | | | |
| USER B | PRESENCE | | | | OFF PROHIBITED |
| USER C | PRESENCE | | | OFF PROHIBITED | OFF PROHIBITED |
| DEFAULT USER | PRESENCE | COLOR PROHIBITED | A3 PROHIBITED | OFF PROHIBITED | OFF PROHIBITED |

| | PRESENCE/ ABSENCE OF JOB PROHIBITION | CONTENT OF JOB PROHIBITION | | | |
|---|---|---|---|---|---|
| | | COPY PROCESS | SCAN PROCESS | PRINT PROCESS | FAX TRANSMISSION PROCESS |
| USER A | ABSENCE | | | | |
| USER B | PRESENCE | | | | PROHIBITED |
| USER C | PRESENCE | | | PROHIBITED | PROHIBITED |
| DEFAULT USER | PRESENCE | | PROHIBITED | PROHIBITED | PROHIBITED |

| | PRESENCE/ ABSENCE OF SETTING PROHIBITION OF COPY PROCESS | CONTENT OF SETTING PROHIBITION OF COPY PROCESS | | | |
|---|---|---|---|---|---|
| | | COLOR SETTING | PAPER SETTING | AGGREGATION SETTING | ECO-PRINT SETTING |
| USER A | ABSENCE | | | | |
| USER B | PRESENCE | | | | OFF PROHIBITED |
| USER C | PRESENCE | | A3 PROHIBITED | OFF PROHIBITED | OFF PROHIBITED |
| DEFAULT USER | PRESENCE | COLOR PROHIBITED | A3 PROHIBITED | OFF PROHIBITED | OFF PROHIBITED |

INFORMATION PROCESSING APPARATUS AND JOB SETTING METHOD

INCORPORATION BY REFERENCE

This application is based upon and claims the benefit of priority from the corresponding Japanese Patent Application No. 2013-180701 filed on Aug. 30, 2013, the entire contents of which are incorporated herein by reference.

BACKGROUND

The present disclosure relates to an information processing apparatus that is able to limit a setting content of a job in accordance with a login state of a user; and a job setting method in the information processing apparatus.

An image processing apparatus (an example of an information processing apparatus) that executes various jobs such as a print job or a scan job may have an authentication function to cause a user to log in thereto in accordance with a preset authentication operation. In addition, in such an image processing apparatus, use authority for a setting content of a setting item regarding a job may be changed in accordance with a login state of a user. For example, it is conceivable that, of "color printing" and "monochrome printing" which are setting contents of color type regarding a print job, "color printing" is usable when a user A1 has logged in but cannot be used when a user A2 has logged in.

Meanwhile, as a method for reducing time and effort for a setting operation of setting each setting item regarding a job, there is a method (hereinafter, referred to as "program function") in which a setting content of each setting item is pre-registerable, and the setting content of each setting item is set at once in accordance with a selection operation of selecting the pre-registered pre-registration information in executing the job.

SUMMARY

An information processing apparatus according one aspect of the present disclosure includes an authentication control portion, a selection portion, an authority specification portion, a first display control portion, a change portion, a setting screen display portion, and a second display control portion. The authentication control portion is configured to cause a user to log in accordance with a preset authentication operation. The selection portion is configured to select pre-registration information in which a setting content of each setting item regarding a job is pre-registered, in accordance with a preset selection operation. The authority specification portion configured to specify use authority that is preset so as to correspond to a non-login state and each user, in accordance with a current login state. The first display control portion is configured to display an authentication screen for performing the authentication operation, if the number of specific items whose setting contents are outside a range of the use authority, of a plurality of the setting items included in the pre-registration information selected by the selection portion exceeds a threshold. The change portion is configured to change the setting content of the specific item to a content within the range of the use authority, if the number of the specific items of the plurality of the setting items included in the pre-registration information selected by the selection portion is equal to or less than the threshold. The setting screen display portion is configured to display a setting screen for setting the specific item whose setting content has been changed by the change portion. The second display control portion is configured to display the authentication screen if the setting content of the specific item is set on the setting screen so as to be outside the range of the use authority.

A job setting method according to another aspect of the present disclosure includes the following first to seventh steps. The first step is a step of causing a user to log in accordance with a preset authentication operation. The second step is a step of selecting pre-registration information in which a setting content of each setting item regarding a job is pre-registered, in accordance with a preset selection operation. The third step is a step of specifying use authority that is preset so as to correspond to a non-login state and each user, in accordance with a current login state. The fourth step is a step of displaying an authentication screen for performing the authentication operation, if the number of specific items whose setting contents are outside a range of the use authority, of a plurality of the setting items included in the pre-registration information selected in the second step exceeds a threshold. The fifth step is a step of changing the setting content of the specific item to a content within the range of the use authority, if the number of the specific items of the plurality of the setting items included in the pre-registration information selected in the second step is equal to or less than the threshold. The sixth step is a step of displaying a setting screen for setting the specific item whose setting content has been changed in the fifth step. The seventh step is a step of displaying the authentication screen if the setting content of the specific item is set on the setting screen so as to be outside the range of the use authority.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B are diagrams showing an example of use authority information used in the multifunction peripheral shown in FIG. 1.

DETAILED DESCRIPTION

Hereinafter, embodiments of the present disclosure will be described with reference to the accompanying drawings to enable understanding of the present disclosure. It should be noted that the following embodiments are examples embodying the present disclosure, and, by nature, do not limit the technical scope of the present disclosure.

Incidentally, the following problem is conceivable when a program function is used in an image processing apparatus in which use authority is changed in accordance with a login state of a user. Specifically, it is conceivable that when pre-registration information selected by the user includes a setting content of a setting item that cannot be used in the current login state, an authentication screen is displayed to prompt the user to log in, in order to make the setting content of the setting item usable. However, it is also conceivable that even after login of the user, the pre-registration information still includes a setting content of a setting item that cannot be used in the current login state. In this case, a configuration is conceivable in which use of the pre-registration information selected by the user is prohibited. However, when use of the pre-registration information is prohibited at this time, a performed selection operation of selecting the pre-registration information by the user and a performed login operation of the user on the authentication screen are wasted. For example, even when the number of setting contents of setting items that cannot be used in the current login state is small in the pre-registration information after login of the user, the user performs an operation for setting a setting content of each setting item regarding a job without using the program function. In contrast, in a multifunction peripheral 10 according to an embodiment of the present disclosure, it is possible to suppress waste of a user operation in setting a setting content of each setting item regarding a job by using the program function.

[Schematic Configuration of Multifunction Peripheral 10]

Figure 1:
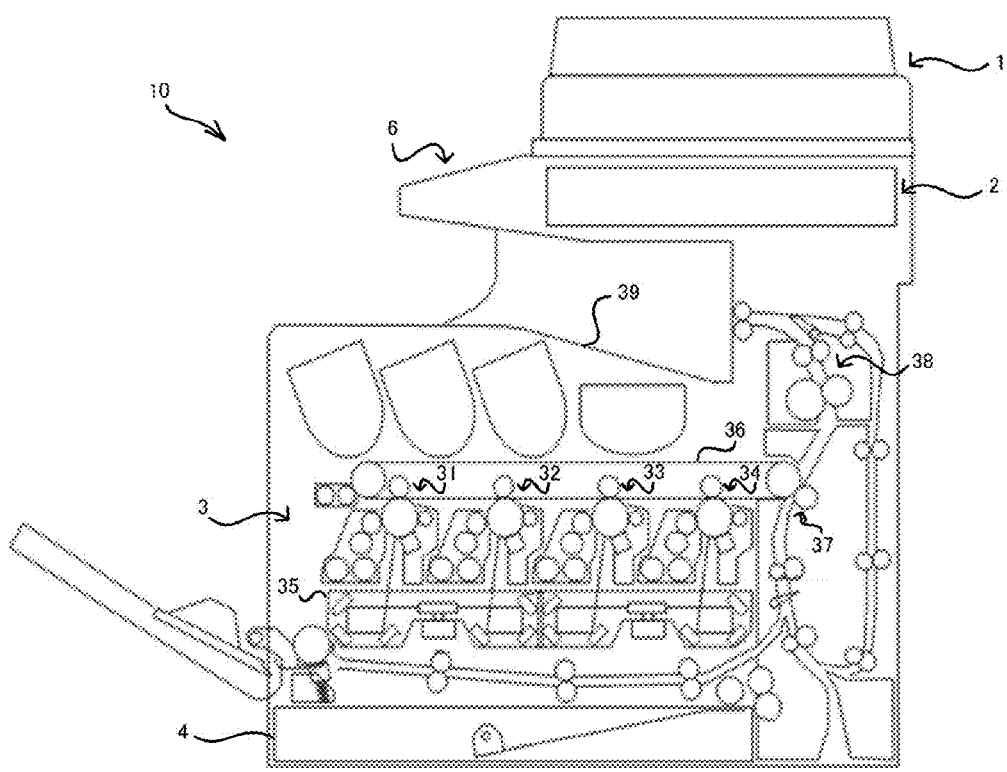
FIG. 1 is a schematic configuration diagram of a multifunction peripheral according to an embodiment of the present disclosure.
Figure 2:
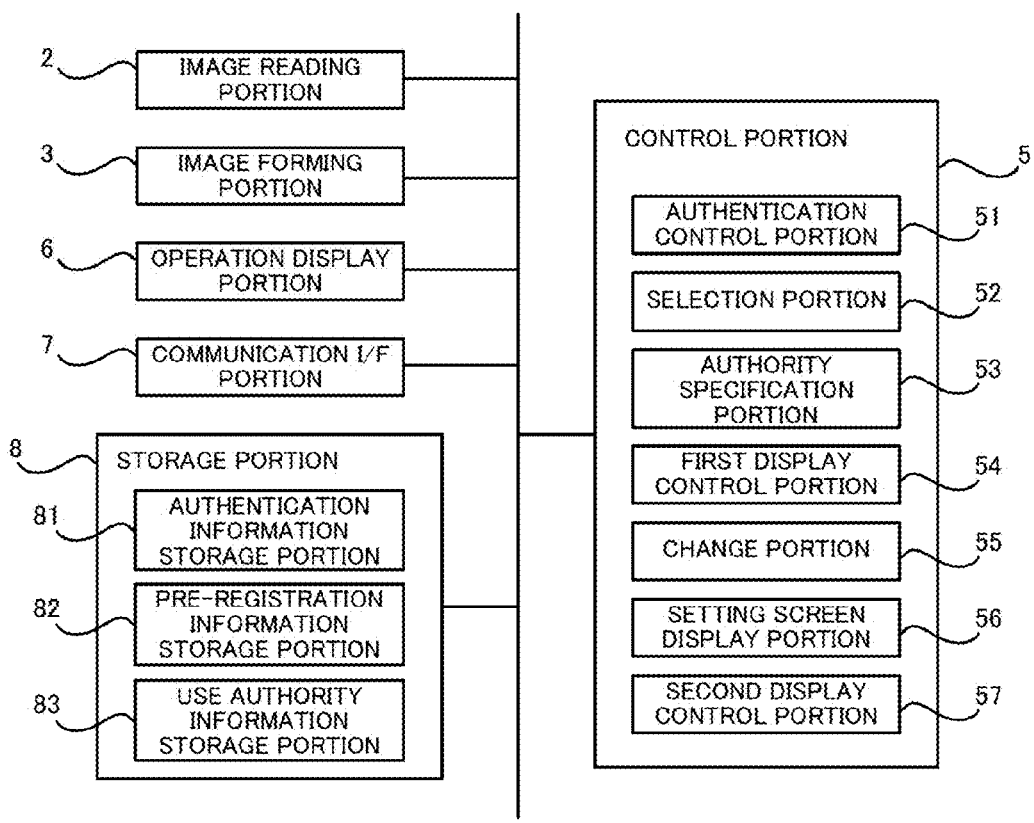
FIG. 2 is a block diagram showing an example of the system configuration of the multifunction peripheral shown in FIG. 1.

First, a schematic configuration of the multifunction peripheral 10 according to the embodiment of the present disclosure will be described with reference to FIGS. 1 and 2. As shown in FIGS. 1 and 2, the multifunction peripheral 10 includes an ADF 1, an image reading portion 2, an image forming portion 3, a sheet feed cassette 4, a control portion 5, an operation display portion 6, a communication I/F portion 7, and a storage portion 8. The multifunction peripheral 10 is able to execute, as a job, each process such as an image reading process of reading image data from a document sheet, an image forming process of forming an image on the basis of image data, or a data transmission process of transmitting image data. It should be noted that the multifunction peripheral 10 is merely an example of an information processing apparatus according to the present disclosure. The present disclosure is also applicable to information processing apparatuses such as a scanner, a printer, a facsimile, a copy machine, a personal computer, a tablet terminal, a smartphone, and a mobile phone.

The ADF 1 is an automatic document feeder that includes a document set portion, a plurality of conveying rollers, a document holder, and a sheet discharge portion which are not shown. In the ADF 1, by each conveying roller being driven by a motor which is not shown, a document sheet placed on the document set portion passes through a reading position at which image data is read by the image reading portion 2, and is conveyed to the sheet discharge portion. Thus, the image reading portion 2 is able to read image data from the document sheet conveyed by the ADF 1.

The image reading portion 2 is an image reading portion that reads image data from a document sheet, and includes a document table, a reading unit, a plurality of mirrors, an optical lens, and a CCD (Charge Coupled Device) which are not shown. The document table is a document placement portion provided on an upper surface of the image reading portion 2. The reading unit applies light to a document sheet at the reading position on the document table. The light reflected on a surface of the document sheet is guided to the optical lens by the plurality of mirrors. The optical lens converges the incident light to cause the light to be incident on the CCD. The CCD includes a photoelectric conversion element that inputs an electrical signal corresponding to an amount of the received light incident from the optical lens, as image data of the document sheet to the control portion 5, and the like.

The image forming portion 3 is an electrophotographic type image forming portion that executes a color or monochrome image forming process (printing process) on the basis of image data read by the image reading portion 2 or image data inputted from an information processing apparatus such as an external personal computer.

Specifically, as shown in FIG. 1, the image forming portion 3 includes a plurality of image forming units 31 to 34, an exposure device (LSU) 35, an intermediate transfer belt 36, a secondary transfer roller 37, a fixing device 38, and a sheet discharge tray 39. The image forming unit 31 is an electrophotographic type image forming unit corresponding to C (cyan), the image forming unit 32 is an electrophotographic type image forming unit corresponding to M (magenta), the image forming unit 33 is an electrophotographic type image forming unit corresponding to Y (yellow), and the image forming unit 34 is an electrophotographic type image forming unit corresponding to K (black). Each of the image forming units 31 to 34 includes a photosensitive drum, a charging device, a developing device, a primary transfer roller, a cleaning device, and the like. The exposure device 35 applies laser light based on image data to each photosensitive drum, thereby forming an electrostatic latent image based on the image data, on each photosensitive drum. Then, a toner image of each color developed on each photosensitive drum by the developing device is intermediately transferred onto the intermediate transfer belt 36, and then is transferred onto a paper sheet supplied from the sheet feed cassette 4, by the secondary transfer roller 37. Then, on the paper sheet onto which each toner image has been transferred, an image is formed by each toner image being melted and fixed by the fixing device 38, and the paper sheet is discharged to the sheet discharge tray 39.

The control portion 5 includes control devices such as a CPU, a ROM, a RAM, and an EEPROM which are not shown. The CPU is a processor that executes various arithmetic processing. The ROM is a nonvolatile storage portion in which information such as control programs for causing the CPU to execute various processing is prestored. The RAM is a volatile storage portion, and the EEPROM is a nonvolatile storage portion. The RAM and the EEPROM are used as temporary storage memories (working areas) for various processing to be executed by the CPU. The control portion 5 performs overall control of the multifunction peripheral 10 by executing various control programs prestored in the ROM by means of the CPU. It should be noted that the control programs may be recorded in a computer-readable recording medium such as a CD, a DVD, or a flash memory, may be read from the recording medium, and may be installed in a storage portion such as the EEPROM of the control portion 5. In addition, the control portion 5 may be composed of an electronic circuit such as an integrated circuit (ASIC). The control portion 5 may be a control portion provided separately from a main control portion that performs overall control of the multifunction peripheral 10.

The operation display portion 6 includes: a display portion such as a liquid crystal display that displays various information in accordance with a control instruction from the control portion 5; and an operation portion such as a hard key or a touch panel that inputs various information to the control portion 5 in accordance with an operation of a user.

The communication I/F portion 7 is a communication interface that connects the multifunction peripheral 10 to a communication network such as the Internet or a LAN and executes data communication via the communication network.

The storage portion 8 is a nonvolatile storage portion such as a hard disk or an SSD that stores image data read by the image reading portion 2 or image data inputted from an information processing apparatus such as an external personal computer.

In addition, as shown in FIG. 2, the storage portion 8 includes an authentication information storage portion 81, a pre-registration information storage portion 82, and a use authority information storage portion 83. Each of the authentication information storage portion 81, the pre-registration information storage portion 82, and the use authority information storage portion 83 is a storage area secured within the storage area of the storage portion 8. It should be noted that any one or more of the authentication information storage portion 81, the pre-registration information storage portion 82, and the use authority information storage portion 83 may be storage areas secured in another storage portion such as the EEPROM of the control portion 5.

Authentication information used for causing the user to log in accordance with a preset authentication operation is stored in the authentication information storage portion 81. Specifically, the authentication information is a user name and a password that are predetermined for each user.

One or more pieces of pre-registration information in which a setting content of each setting item regarding a job is pre-registered are stored in the pre-registration information storage portion 82. In each piece of the pre-registration information, a name that specifies the pre-registration information, the type of the job, and the setting content of each setting item regarding the job are pre-registered. For example, in the pre-registration information, the contents thereof are pre-registered by the control portion 5 in accordance with an operation input with respect to the operation display portion 6 by the user in initial setting of the multifunction peripheral 10 or the like, and the pre-registration information is stored in the pre-registration information storage portion 82.

Figure 3A:
FIGS. 3A and 3B are diagrams showing examples of pre-registration information used in the multifunction peripheral shown in FIG. 1.
Figure 3B:

Here, FIGS. 3A and 3B show examples of the pre-registration information stored in the pre-registration information storage portion 82. In pre-registration information D10 shown in FIG. 3A, "program 1" is registered as the name, and "copy process" is registered as the type of the job. In addition, in the pre-registration information D10, setting contents are registered for "color setting", "paper setting", "aggregation setting", and "eco-print setting", respectively, which are setting items regarding the copy process. Specifically, in the pre-registration information D10, the setting content of the color setting is "color", and the setting content of the paper setting is "A4". In addition, in the pre-registration information D10, the setting content of the aggregation setting is "OFF", and the setting content of the eco-print setting is "OFF".

The aggregation function is a function to print images of a plurality of document sheets on a single paper sheet. As a setting content of the aggregation function, "2 IN 1" in which images of two document sheets are printed on a single paper sheet or "4 IN 1" in which images of four document sheets are printed on a single paper sheet is selectable. In addition, the eco-print function is a function to perform printing with a smaller amount of toner than that when a general copy function is used, thereby saving toner consumption. As a setting content of the eco-print function, "ON" or "OFF" is selectable. It should be noted that as a setting content of the color setting, either "color printing" or "monochrome printing" is selectable. In addition, as a setting content of the paper setting, various paper sheet sizes such as "A3", "A4", and "B5" are selectable.

Similarly, in pre-registration information D11 shown in FIG. 3B, "program 2" is registered as the name, and "scan process" is registered as the type of the job. In addition, in the pre-registration information D11, setting contents are registered for "color setting", "document setting", and "file format setting", respectively, which are setting items regarding the scan process.

Use authority information representing use authority that is preset so as to correspond to a non-login state and each user is stored in the use authority information storage portion 83. For example, the use authority information is prestored in the use authority information storage portion 83 by the control portion 5 in accordance with an operation input with respect to the operation display portion 6 by a user having administrator authority in initial setting of the multifunction peripheral 10 or the like.

Specifically, the use authority information includes job authority information D20 shown in FIG. 4A and setting authority information D30 shown in FIG. 4B. It should be noted that each blank space in FIGS. 4A and 4B indicates that no prohibited content has been set.

As shown in FIG. 4A, in the job authority information D20, presence/absence of prohibition regarding the type of the job and the content of the prohibition are set for each of a user A, a user B, a user C, and a default user. Examples of the type of the job include "copy process", "scan process", "print process", "data transmission process", "network scan process", and "fax transmission process". It should be noted that the default user is preset as a user in a non-login state where the user has not logged in to the multifunction peripheral 10.

In addition, as shown in FIG. 4B, in the setting authority information D30, presence/absence of prohibition regarding a setting content of each setting item of the copy process and the content of the prohibition are set for each of the user A, the user B, the user C, and the default user. Specifically, examples of the setting item include "color setting", "paper setting", "aggregation setting", and "eco-print setting".

For example, in the setting authority information D30, for the default user, it is set that use of "color" of the color setting, "A3" of the paper setting, "OFF" of the aggregation setting, and "OFF" of the eco-print setting is prohibited. Meanwhile, for the user B, use of "OFF" of the eco-print setting is prohibited, and for the user C, use of "OFF" of the aggregation setting and "OFF" of the eco-print setting is prohibited. It should be noted that here, the copy process is described as an example, but the use authority information also includes the setting authority information D30 regarding the other jobs.

In the multifunction peripheral 10, the control portion 5 controls whether to execute each of the jobs by the user and execution conditions of the jobs, on the basis of the pre-registration information, the job authority information D20, and the setting authority information D30.

Specifically, as shown in FIG. 2, the control portion 5 includes an authentication control portion 51, a selection portion 52, an authority specification portion 53, a first display control portion 54, a change portion 55, a setting screen display portion 56, and a second display control portion 57. The control portion 5 functions as the authentication control portion 51, the selection portion 52, the authority specification portion 53, the first display control portion 54, the change portion 55, the setting screen display portion 56, and the second display control portion 57 by executing the control programs stored in the ROM by means of the CPU.

The authentication control portion 51 executes an authentication process of causing the user to log in accordance with a preset authentication operation. Specifically, the authentication control portion 51 displays an authentication screen 61 on the operation display portion 6 as necessary. Then, the authentication control portion 51 accepts an input operation of inputting login information with respect to the operation display portion 6 by the user on the authentication screen 61. Here, the input operation is an example of the authentication operation. Thereafter, the authentication control portion 51 determines completion of authentication if the login information inputted from the operation display portion 6 is included in the authentication information, and causes the user to log in to the multifunction peripheral 10. It should be noted that the authentication control portion 51 executes a logout process of causing the user, who has logged in, to log out when a logout operation is performed with respect to the operation display portion 6, when a preset time period has elapsed, or when another user is caused to log in.

Figure 5:
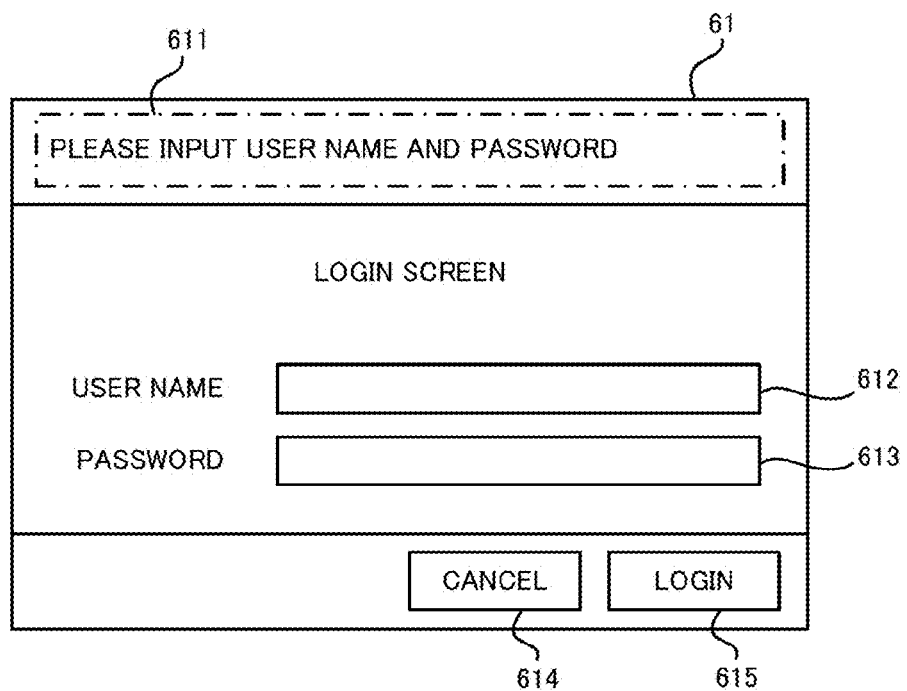
FIG. 5 is a diagram showing an example of an authentication screen displayed on the multifunction peripheral shown in FIG. 1.

Here, FIG. 5 shows an example of the authentication screen 61. On the authentication screen 61 shown in FIG. 5, a message field 611, a user name input field 612, a password input field 613, a cancel key 614, and a login key 615 are displayed. The user is allowed to input a user name and a password each of which is the login information, in the user name input field 612 and the password input field 613 by using the operation display portion 6.

The selection portion 52 selects any of the pre-registration information stored in the pre-registration information storage portion 82, in accordance with a preset selection operation. Specifically, the selection portion 52 displays a program selection screen 62 in accordance with an operation of an operation key that is displayed on the operation display portion 6 and used for using the program function. Then, the selection portion 52 reads out the selected pre-registration information from the pre-registration information storage portion 82 in accordance with the selection operation by the user on the program selection screen 62.

Figure 6:
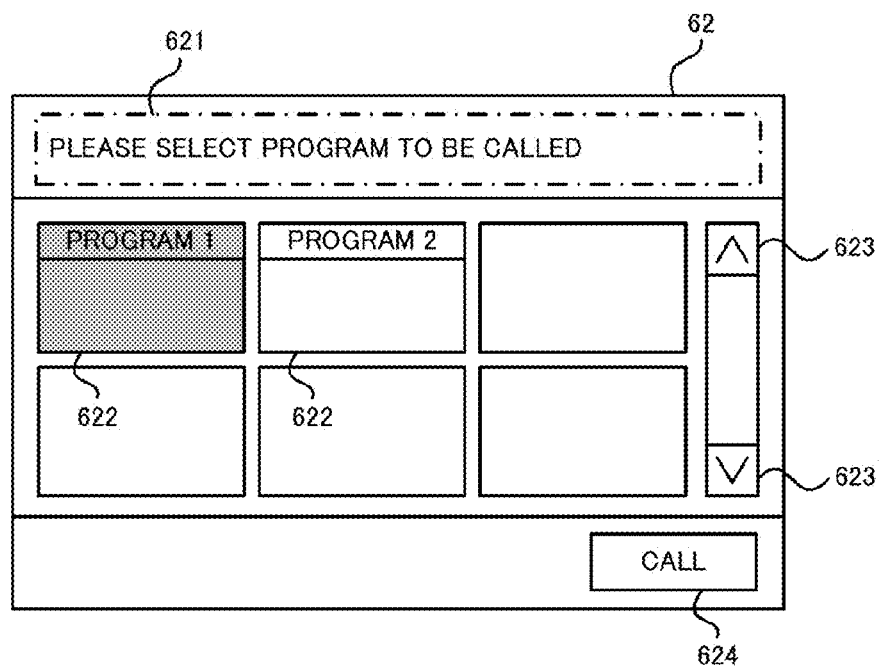
FIG. 6 is a diagram showing an example of a program selection screen displayed on the multifunction peripheral shown in FIG. 1.

Here, FIG. 6 shows an example of the program selection screen 62. On the program selection screen 62 shown in FIG. 6, a message field 621, a plurality of program selection keys 622, scroll keys 623, and a call key 624 are displayed. In each program selection key 622, the name of each piece of the pre-registration information stored in the pre-registration information storage portion 82 is displayed. A display of the pre-registration information on the program selection screen 62 is scrolled up and down in accordance with operations of the scroll keys 623. When any one of the program selection keys 622 is operated on the program selection screen 62, the pre-registration information corresponding to the operated program selection key 622 becomes selected. In addition, the operation display portion 6 displays the operated program selection key 622 in a color (e.g., gray) different from the color of the other program selection key 622. Then, when the call key 624 is operated in the state where the pre-registration information has been selected, the selection portion 52 reads out the selected pre-registration information from the pre-registration information storage portion 82. Here, the selection of the pre-registration information on the program selection screen 62 and the operation of the call key 624 are an example of the selection operation.

The authority specification portion 53 specifies use authority that is preset so as to correspond to a non-login state and each user, in accordance with the current login state. Specifically, the authority specification portion 53 is able to specify use authority of the user who is in a non-login state or has logged in, on the basis of the use authority information stored in the use authority information storage portion 83.

On the basis of the use authority specified by the authority specification portion 53, the first display control portion 54 displays the authentication screen 61 for performing the authentication operation, if the number of specific items whose setting contents are outside the range of the use authority, of a plurality of the setting items included in the pre-registration information selected by the selection portion 52, exceeds a preset threshold. It should be noted that the threshold is a value that is preset as an index for determining whether to validate the settings based on the pre-registration information by using the program function. Specifically, it is conceivable that the threshold is 1. In this case, the first display control portion 54 displays the authentication screen 61 if the number of the specific items included in the pre-registration information is equal to or higher than 2, and does not display the authentication screen 61 if the number of the specific items is 0 or 1. It should be noted that the threshold is not limited to 1, and may be set at an appropriate value corresponding to the number of the setting items registered in the pre-registration information. In addition, it is also conceivable that the control portion 5 changes the threshold on the basis of the number of the setting items such that: the threshold is 1 when the number of the setting items registered in the pre-registration information is 1 to 5; and the threshold is 2 when the number of the setting items is 6 to 10, and performs the determination.

If the number of the specific items of the plurality of the setting items included in the pre-registration information selected by the selection portion 52 is equal to or less than the threshold, the change portion 55 changes the setting content of each of the specific items included in the pre-registration information, to a content within the range of the use authority on the basis of the use authority specified by the authority specification portion 53.

The setting screen display portion 56 displays a setting screen 63 for setting the specific item whose setting content has been changed by the change portion 55.

Figure 7A:
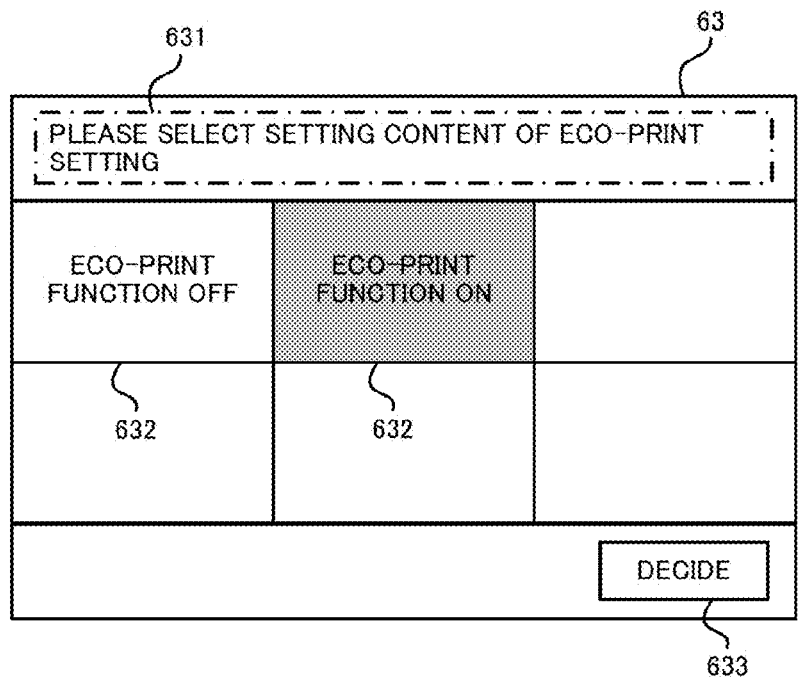
FIGS. 7A and 7B are diagrams showing an example of a setting screen displayed on the multifunction peripheral shown in FIG. 1.

Here, FIG. 7A shows an example of the setting screen 63. On the setting screen 63 shown in FIG. 7A, a message field 631, setting content selection keys 632, and a decision key 633 are displayed. Various messages to the user are displayed in the message field 631. In each setting content selection key 632, a setting content that is selectable by the user is displayed. When any one of the setting content selection keys 632 is operated, the setting screen 63 comes into a state where the setting content corresponding to the operated setting content selection key 632 has been selected. It should be noted that the setting screen display portion 56 displays a state where a setting content that has been changed by the change portion 55 has been selected, as an initial state on the setting screen 63.

Figure 7B:
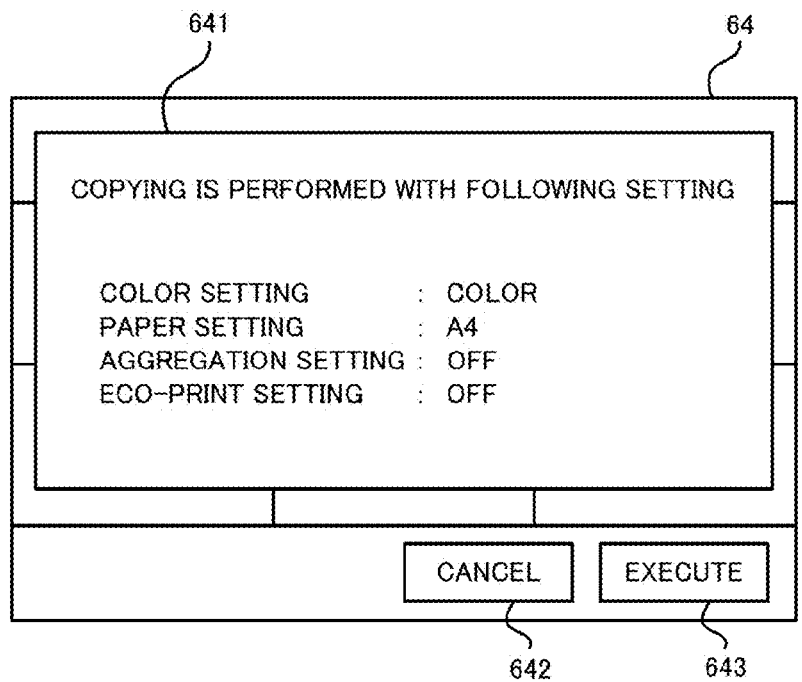

Then, when the decision key 633 is operated in the state where the setting content has been selected, the setting screen display portion 56 displays a setting content confirmation screen 64 shown in FIG. 7B on the operation display portion 6. On the setting content confirmation screen 64 shown in FIG. 7B, a setting content confirmation field 641, a cancel key 642, and an execution key 643 are displayed. In the setting content confirmation field 641, the setting content of each setting item of the job that has been set by using the program function is displayed. Then, when the execution key 643 is operated on the setting content confirmation screen 64 by the user, the control portion 5 performs an execution process of executing the job on the basis of the execution conditions displayed in the setting content confirmation field 641. It should be noted that the setting screen display portion 56 may display an initial screen corresponding to each type of the job that has been set by using the program function, instead of displaying the setting content confirmation screen 64.

The second display control portion 57 displays the authentication screen 61 if the setting content of the specific item on the setting screen 63 is set so as to be outside the range of the use authority. Specifically, the second display control portion 57 determines whether the setting content of the specific item is set so as to be outside the range of the use authority, on the basis of the use authority specified by the authority specification portion 53.

[Job Setting Process]

Figure 8:
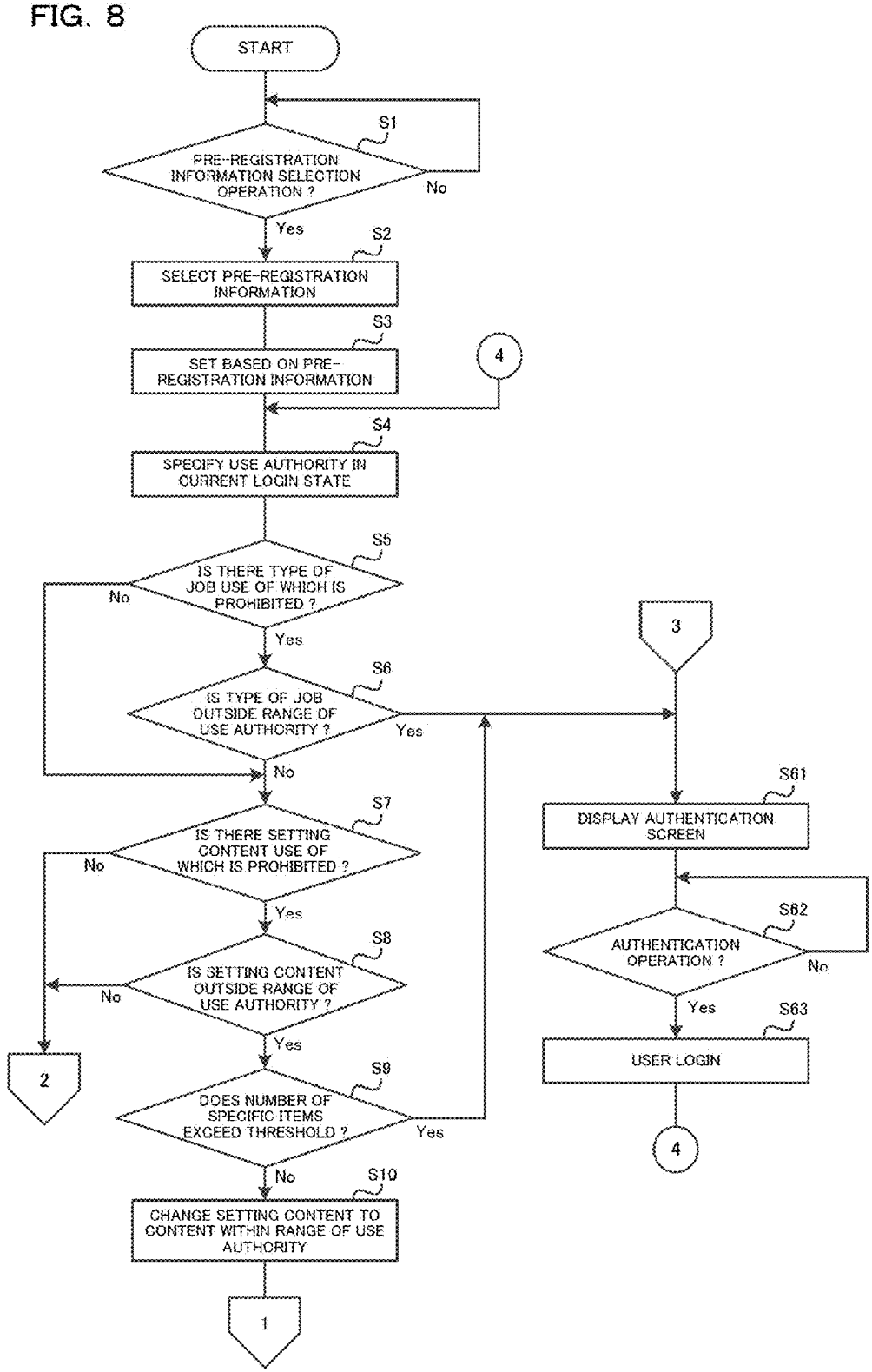
FIG. 8 is a flowchart showing an example of a job setting process executed in the multifunction peripheral shown in FIG. 1.
Figure 9:
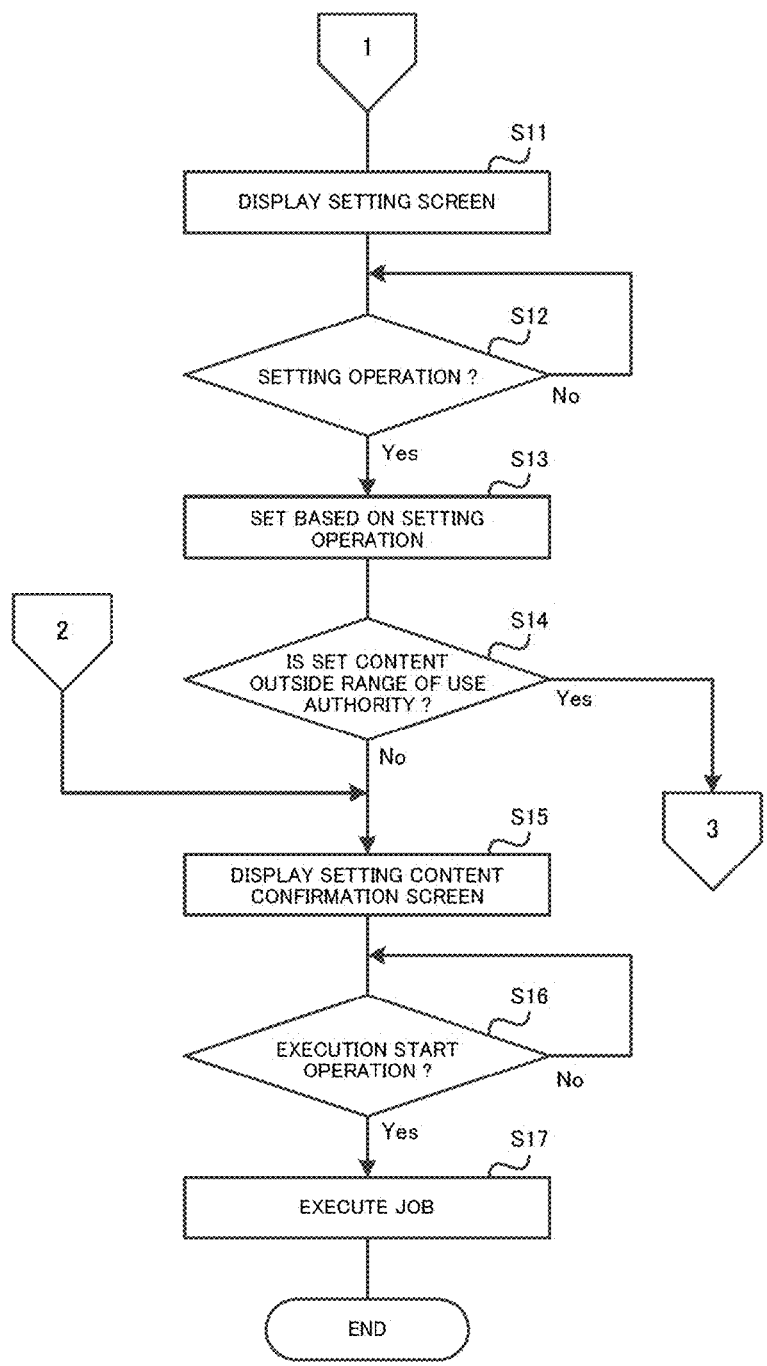
FIG. 9 is a flowchart showing the example of the job setting process executed in the multifunction peripheral shown in FIG. 1.

Hereinafter, an example of a procedure of a job setting process executed by the control portion 5 in the multifunction peripheral 10 will be described with reference to FIGS. 8 and 9. Steps S1, S2, . . . represent numbers of process procedures (steps) executed by the control portion 5. A method including each process procedure of the job setting process executed by the control portion 5 is an example of a job setting method according to the present disclosure. When an operation input of using the program function is performed with respect to the operation display portion 6 by the user, the control portion 5 displays the program selection screen 62 on the operation display portion 6 and executes the job setting process. In addition, here, the case where the threshold is set at "1" will be described as an example.

<Step S1>

First, in step S1, the control portion 5 determines whether the selection operation with respect to the pre-registration information displayed on the program selection screen 62 has been performed.

Here, if the control portion 5 determines that the selection operation has been performed (Yes in S1), the control portion 5 advances the processing to step S2. In addition, if the selection operation has not been performed (No in S1), the control portion 5 waits for the selection operation in step S1.

<Step S2>

In step S2, the control portion 5 selects any of the pre-registration information stored in the pre-registration information storage portion 82, in accordance with the selection operation in step S1, and reads out the selected pre-registration information from the pre-registration information storage portion 82. Here, the process in step S2 is an example of a second step and is executed by the selection portion 52 of the control portion 5.

<Step S3>

In step S3, the control portion 5 sets the pre-registration information read out in step S2, as a type of a job to be executed and a setting content of each setting item regarding the job, using the program function by expanding the pre-registration information into the RAM of the control portion 5.

<Step S4>

In step S4, the control portion 5 reads out the use authority information corresponding to a user who is in a non-login state or has logged in, from the use authority information storage portion 83, and specifies use authority corresponding to the current login state. Here, the process in step S4 is an example of a third step and is executed by the authority specification portion 53 of the control portion 5.

<Step S5>

In step S5, the control portion 5 determines presence/absence of a type of a job use of which is prohibited in the current login state, on the basis of the job authority information D20 included in the use authority information read out in step S4.

Here, if the control portion 5 determines that there is a type of a job use of which is prohibited in the current login state (Yes in S5), the control portion 5 advances the processing to step S6. In addition, if the control portion 5 determines that there is no type of a job use of which is prohibited (No in S5), the control portion 5 advances the processing to step S7.

<Step S6>

In step S6, the control portion 5 determines whether the type of the job in the pre-registration information read out in step S2 is outside the range of the use authority specified in step S4. Specifically, the control portion 5 determines whether the type of the job is outside the range of the use authority, by determining whether the type of the job corresponds to the type of the job use of which is prohibited in the current login state, on the basis of the job authority information D20 included in the use authority information read out in step S4.

Here, if the control portion 5 determines that the type of the job in the pre-registration information is outside the range of the use authority (Yes in S6), the control portion 5 advances the processing to step S61. In addition, if the control portion 5 determines that the type of the job in the pre-registration information is not outside the range of the use authority (No in S6), the control portion 5 advances the processing to step S7.

<Step S61>

In step S61, the control portion 5 displays the authentication screen 61 on the operation display portion 6. It is also conceivable that together with the authentication screen 61, the control portion 5 displays on the operation display portion 6 that a login operation is required since use of the type of the job or the current setting content of the setting item is prohibited in the current login state.

<Step S62>

In step S62, the control portion 5 determines whether the authentication operation has been performed by the user with respect to the authentication screen 61 displayed on the operation display portion 6.

Here, if the control portion 5 determines that the authentication operation has been performed (Yes in S62), the control portion 5 advances the processing to step S63. In addition, if the authentication operation has not been performed (No in S62), the control portion 5 waits for the authentication operation in step S62. It should be noted that if the cancel key 614 is operated on the authentication screen 61, the control portion 5 returns the display screen of the operation display portion 6 to the program selection screen 62, the setting screen 63, or the like which is prior to displaying the authentication screen 61. In addition, it is also conceivable that if the cancel key 614 is operated on the authentication screen 61, the control portion 5 performs a process of initializing the setting of the job performed in step S3 and then advances the processing to step S1.

<Step S63>

In step S63, the control portion 5 executes the authentication process for the user in accordance with the authentication operation performed in step S62, and causes the user to log in if an authentication result is a match (an example of a first step). Thereafter, the control portion 5 advances the processing to step S4. Here, the processes in steps S62 and 63 are executed by the authentication control portion 51. If the authentication result is a mismatch, the control portion 5 returns the processing to step S62.

<Step S7>

In step S7, the control portion 5 determines presence/absence of a setting content use of which is prohibited in the current login state, for the type of the job in the pre-registration information read out in step S2, on the basis of the setting authority information D30 included in the use authority information read out in step S4.

Here, if the control portion 5 determines that there is a setting content use of which is prohibited (Yes in S7), the control portion 5 advances the processing to step S8. In addition, if the control portion 5 determines that there is no setting content use of which is prohibited (No in S7), the control portion 5 advances the processing to step S15.

<Step S8>

In step S8, the control portion 5 determines whether the setting content regarding the type of the job in the pre-registration information read out in step S2 is outside the range of the use authority specified in step S4. Specifically, the control portion 5 determines whether the setting content is outside the range of the use authority, by determining whether the setting content of each setting item regarding the type of the job corresponds to a setting content use of which is prohibited in the current login state, on the basis of the setting authority information D30 included in the use authority information read out in step S4.

Here, if the control portion 5 determines that the setting content regarding the type of the job is outside the range of the use authority (Yes in S8), the control portion 5 advances the processing to step S9. In addition, if the control portion 5 determines that the setting content is not outside the range of the use authority (No in S8), the control portion 5 advances the processing to step S15.

<Step S9>

In step S9, the control portion 5 determines whether the number of the specific items included in the pre-registration information exceeds the threshold. Specifically, in step S8, the control portion 5 determines whether the number of the specific items exceeds the threshold, by counting the number of the setting contents regarding the type of the job that are determined as being outside the range of the use authority. It should be noted that the threshold is "1".

Here, if the control portion 5 determines that the number of the specific items included in the pre-registration information exceeds the threshold (Yes in S9), the control portion 5 advances the processing to step S61 and displays the setting screen 63. In other words, the first display control portion 54 displays the authentication screen 61 if the number of the specific items included in the pre-registration information exceeds 1 (an example of a fourth step). In addition, if the control portion 5 determines that the number of the specific items included in the pre-registration information does not exceed the threshold (No in S9), the control portion 5 advances the processing to step S10. Here, the processes in steps S8 and S9 are executed by the first display control portion 54.

<Step S10>

In step S10, the control portion 5 changes the setting content of the specific item included in the pre-registration information to a content within the range of the use authority in the current login state. Specifically, the control portion 5 rewrites the setting content of the setting item determined as the specific item in step S8, of the setting items of the job set in step S3, on the basis of the setting authority information D30 included in the use authority information read out in step S4. Then, the control portion 5 advances the processing to step S11. Here, the process in step S10 is an example of a fifth step and is executed by the change portion 55. It should be noted that if a plurality of setting contents within the range of the use authority are present, for example, a setting content that is present as a standard setting is selected from among the plurality of setting contents. In addition, it is also conceivable that a setting content that has the highest priority among priorities preset for the plurality of setting contents and is within the range of the use authority is selected.

<Step S11>

In step S11, the control portion 5 displays, on the operation display portion 6, the setting screen 63 for the specific item whose setting content has been changed in step S10. At that time, in the case where the threshold is set at "1", the only one setting screen 63 is displayed in step S11. Thus, the present disclosure is also applicable to a simple configuration in which the multifunction peripheral 10 does not have a function to simultaneously or sequentially display a plurality of the setting screens 63. It is also conceivable that the control portion 5 displays that the setting content is outside the range of the use authority, by displaying the setting content use of which is prohibited with respect to the user, on the setting screen 63 in grayout or the like. Here, the process in step S11 is an example of a sixth step and is executed by the setting screen display portion 56 of the control portion 5.

<Step S12>

In step S12, the control portion 5 determines whether a setting operation has been performed by the user on the setting screen 63 displayed in step S11.

Here, if the control portion 5 determines that the setting operation has been performed (Yes in S12), the control portion 5 advances the processing to step S13. In addition, if the setting operation has not been performed (No in S12), the control portion 5 waits for the setting operation in step S12.

<Step S13>

In step S13, the control portion 5 sets the setting content of the specific item on the basis of the setting operation performed in step S12. Specifically, the control portion 5 stores the setting content of the specific item selected by the setting operation, in the RAM of the control portion 5.

<Step S14>

In step S14, the control portion 5 determines whether the setting content of the specific item that has been set in step S13 is outside the range of the use authority specified in step S4. Specifically, the control portion 5 determines whether the setting content of the specific item is outside the range of the use authority, by determining whether the setting content corresponds to a setting content use of which is prohibited in the current login state, on the basis of the setting authority information D30 included in the use authority information read out in step S4. Here, the process in step S14 is executed by the second display control portion 57 of the control portion 5.

Here, if the control portion 5 determines that the setting content of the specific item set in step S13 is outside the range of the use authority (Yes in S14), the control portion 5 advances the processing to step S61. In other words, the second display control portion 57 displays the authentication screen 61 if the setting content of the specific item is set on the setting screen 63 so as to be outside the range of the use authority (an example of a seventh step). In addition, if the control portion 5 determines that the setting content of the specific item set in step S13 is not outside the range of the use authority (No in S14), the control portion 5 advances the processing to step S15.

<Step S15>

In step S15, the control portion 5 displays the setting content confirmation screen 64 on the operation display portion 6. Specifically, on the basis of the setting content of each setting item stored in the RAM, the control portion 5 displays the type of the job and the setting content of each setting item in the setting content confirmation field 641 of the setting content confirmation screen 64.

<Step S16>

In step S16, the control portion 5 determines whether an execution start operation for the job has been performed. Specifically, the control portion 5 determines whether a user operation of the execution key 643 has been performed with respect to the setting content confirmation screen 64 displayed in step S15.

Here, if the control portion 5 determines that the execution start operation has been performed (Yes in S16), the control portion 5 advances the processing to step S17. In addition, if the execution start operation has not been performed (No in S16), the control portion 5 waits for the execution start operation in step S16. It is also conceivable that if the cancel key 642 is operated on the setting content confirmation screen 64, the control portion 5 initializes the setting contents of the job set in steps S3 and S13 and advances the processing to step S1.

<Step S17>

In step S17, the control portion 5 executes the job corresponding to the type of the job indicated by the pre-registration information read out in step S2, in accordance with the setting contents of the job set in steps S3 and S13.

As described above, in the job setting process executed in the multifunction peripheral 10, even when the specific items are included in the read-out pre-registration information, if the number of the specific items does not exceed the threshold, the authentication screen 61 is not displayed. Then, in this case, the setting content of the specific item is automatically changed to a setting content within the range of the use authority, and the setting screen 63 in which the changed setting content has been selected is displayed. Thus, if the number of the specific items included in the pre-registration information is equal to or less than the threshold, it is possible to continue setting by using the program function, and waste of a user operation is suppressed in setting a content of each setting item regarding a job by using the program function. In particular, in the case where the threshold is "1", the present disclosure is also applicable to a simple configuration in which, for example, a screen splitting function to simultaneously display a plurality of the setting screens 63 or a wizard function to sequentially display a plurality of setting screens 63 is not provided.

In the present embodiment, the case where the authentication control portion 51 executes the authentication process on the basis of the authentication information stored in the authentication information storage portion 81 has been described as an example. Meanwhile, it is also conceivable that the authentication process is executed by an authentication sever connected to the multifunction peripheral 10 via the communication network in a communicable manner. In this case, the authentication sever includes a storage portion in which the authentication information has been stored. The authentication control portion 51 transmits the login information inputted on the authentication screen 61, to the authentication sever. Meanwhile, the authentication sever determines whether the login information received from the multifunction peripheral 10 is included in the authentication information stored in the storage portion, and transmits the determination result to the multifunction peripheral 10. Thus, the authentication control portion 51 is able to determine whether the user has logged in, on the basis of the determination result received from the authentication sever. It is also conceivable that the authentication sever includes the use authority information storage portion 83 and transmits the use authority information of the user corresponding to the authentication information together with the determination result to the multifunction peripheral 10.

In addition, in the present embodiment, the case where the job setting process is executed in the multifunction peripheral 10 has been described as an example. Meanwhile, it is also conceivable as another embodiment that the job setting process is executed by an information processing apparatus such as a personal computer that is connected in a communicable manner to an image processing apparatus such as a printer, a copying machine, a facsimile apparatus, a scanner, or a multifunction peripheral. In this case, a printer driver for controlling the image processing apparatus is installed in the information processing apparatus such as a personal computer. Then, a control portion such as a CPU mounted in the information processing apparatus executes the job setting process in accordance with the printer driver.

[Screen Transition in Job Setting Process]

Hereinafter, an example of screen transition when the job setting process is executed in the multifunction peripheral 10 will be described with reference to FIGS. 10A to 10E. Here, as an example, the case will be described in which the default user shown in the use authority information in FIGS. 4A and 4B performs an operation input for requesting execution of a job with respect to the operation display portion 6 by using the program function.

Figure 10A:
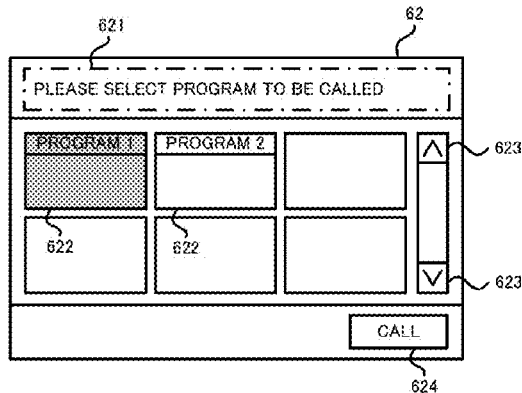
FIGS. 10A to 10E are diagrams showing an example of screen transition in the job setting process executed in the multifunction peripheral shown in FIG. 1.

First, as shown in FIG. 10A, the program selection screen 62 is displayed on the operation display portion 6. On the program selection screen 62 shown in FIG. 10A, the names "program 1" and "program 2" corresponding to the pre-registration information D10 and D11 shown in FIGS. 3A and 3B are displayed in the respective program selection keys 622. Here, the description will be continued with the case where the program selection key 622 in which "program 1" corresponding to the pre-registration information D10 is displayed is selected by the default user and the call key 624 is operated by the user.

Figure 10D:
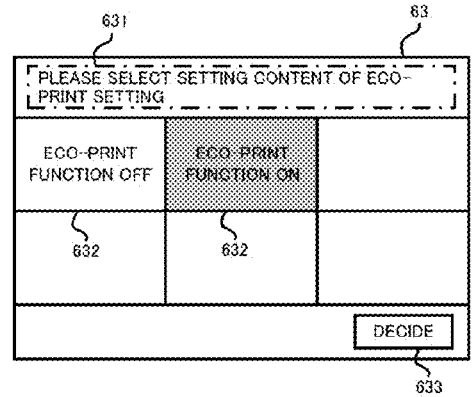
Figure 10B:
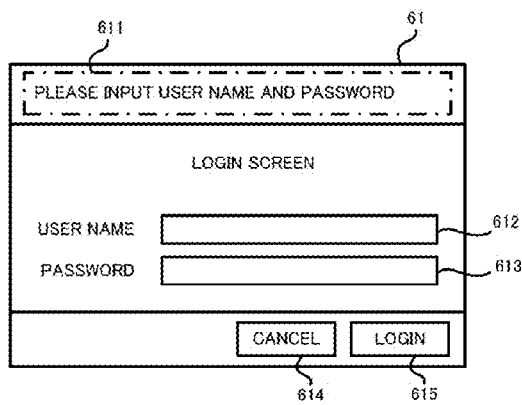
Figure 10E:
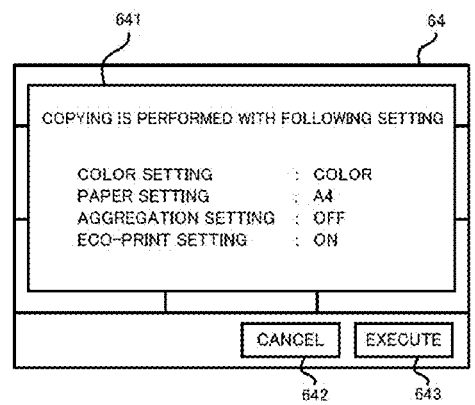
Figure 10C:
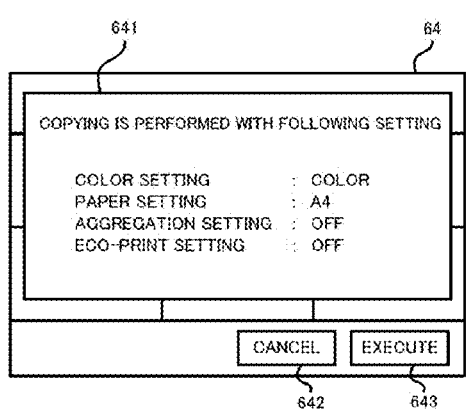

When the call key 624 is operated by the default user, the authentication screen 61 is displayed as shown in FIG. 10B, since the setting contents of the respective setting items registered in the selected pre-registration information D10 include the setting contents use of which is prohibited for the default user in the setting authority information D30. Here, when the login information that matches the authentication information is inputted and the login key 615 is operated, the multifunction peripheral 10 transits to a login state of the user corresponding to the login information. If the user who logs in at that time is the user A, the setting content confirmation screen 64 is displayed as shown in FIG. 10C, since the setting content of each setting item registered in the pre-registration information D10 is within the range of the use authority.

Meanwhile, if the user who logs in at that time is the user B, the number of the specific items of a plurality of the setting items included in the pre-registration information D10 does not exceed "1", which is the threshold. Thus, as shown in FIG. 10D, the setting screen 63 for the eco-print setting which is the specific item is displayed. Here, the setting content "OFF" of the eco-print setting registered in the pre-registration information D10 is changed by the control portion 5 to the setting content "ON" which is a setting content within the range of the use authority of the user B. Thus, the setting screen 63 is displayed in a state where "ON" which is the setting content changed by the control portion 5 has been selected. Here, when the decision key 633 is operated by the user B in the state where the setting content "ON" has been selected, the setting content confirmation screen 64 is displayed as shown in FIG. 10E.

In addition, if the user who logs in at that time is the user C, the number of the specific items of the plurality of the setting items included in the pre-registration information D10 exceeds "1", which is the threshold. Thus, the authentication screen 61 in FIG. 10B is displayed again. It is also conceivable that in this case, in the job setting process, the control portion 5 performs a process of displaying a message that the selected pre-registration information cannot be used, on the operation display portion 6 instead of displaying the authentication screen 61.

[Another Example of Job Setting Process]

Hereinafter, another example of the job setting process executed in the multifunction peripheral 10 will be described. The job setting process described here is a process applied to the case where the threshold is set least "2". It should be noted that here, only the difference from the job setting process shown in FIGS. 8 and 9 will be described. Specifically, in the other example of the job setting process, the content of the process of displaying the setting screen 63 in step S11 is different.

First, in step S11, if the number of the specific items is "1", the one setting screen 63 is displayed on the operation display portion 6 by the control portion 5 similarly to the above-described embodiment.

On the other hand, if the number of the specific items is at least "2", in step S11, the control portion 5 sequentially displays a plurality of the setting screens 63 corresponding to the plurality of the specific items. Specifically, the control portion 5 sequentially displays a plurality of the setting screens 63 corresponding to the plurality of the specific items in a wizard format, which is an interactive format with the user, in accordance with setting operations on the setting screens 63. As described above, in a configuration in which the multifunction peripheral 10 has a wizard display function to sequentially display a plurality of the setting screens 63, it is possible to set the threshold at "2" or higher.

In addition, it is also conceivable as another embodiment that the operation display portion 6 has a screen splitting function to split the display screen and simultaneously display a plurality of screens. In this case, it is conceivable that in step S11, the control portion 5 simultaneously displays a plurality of the setting screens 63 corresponding to a plurality of the specific items on the operation display portion 6 by the screen splitting function of the operation display portion 6. For example, when the threshold is "2" and the number of the specific items included in the pre-registration information is "2", the control portion 5 splits the display screen of the operation display portion 6 into two sections and simultaneously displays the two setting screens 63 corresponding to the two specific items. As described above, even in the configuration where the multifunction peripheral 10 has the screen splitting function, it is possible to set the threshold at "2" or higher.

[Screen Transition in Another Example of Job Setting Process]

Figure 11A:
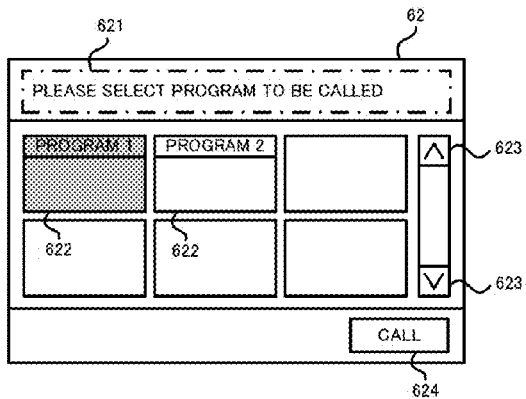
FIGS. 11A to 11E are diagrams showing another example of the screen transition in the job setting process executed in the multifunction peripheral shown in FIG. 1.
Figure 11B:
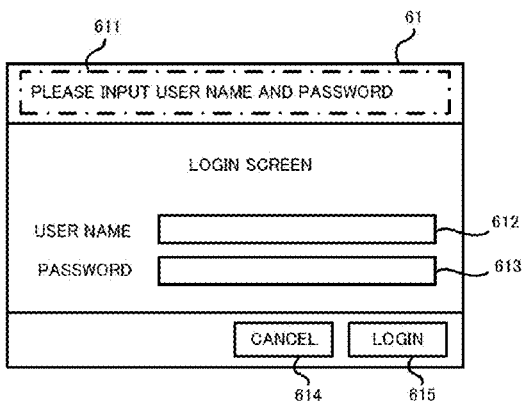

Hereinafter, an example of screen transition when another example of the job setting process is executed in the multifunction peripheral 10 will be described with reference to FIGS. 11A to 11E. Here, the case will be described in which a plurality of the setting screens 63 are displayed by the wizard function. It should be noted that the description of FIGS. 11A and 11B is the same as the description of FIGS. 10A and 10B and thus is omitted. Here, a description will be given on the assumption that the user C logs in on the authentication screen 61 shown in FIG. 11B. In addition, in the multifunction peripheral 10, the threshold is set at "2".

Figure 11C:
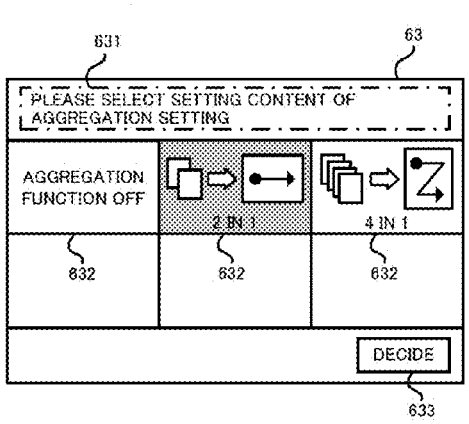

When the user C logs in, the number of the specific items of the plurality of the setting items included in the pre-registration information D10 does not exceed "2" which is the threshold. Thus, first, as shown in FIG. 11C, the setting screen 63 for the aggregation setting which is the specific item is displayed. Here, the setting content "OFF" of the aggregation setting registered in the pre-registration information D10 is changed by the control portion 5 to "2 IN 1" which is a setting content within the range of the use authority of the user C. Thus, the setting screen 63 corresponding to the aggregation setting is displayed in a state where "2 IN 1" which is the setting content changed by the control portion 5 has been selected.

Figure 11D:
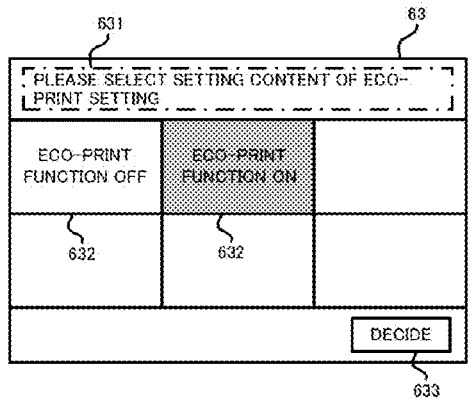
Figure 11E:
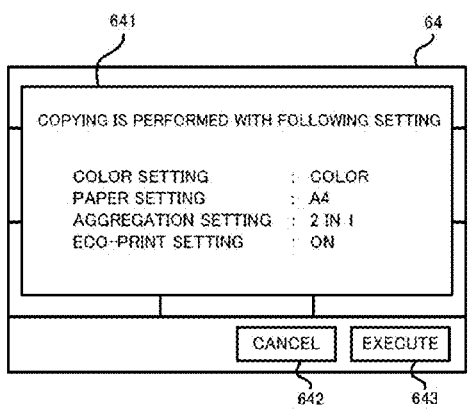

Here, when the decision key 633 is operated by the user C in the state where the setting content "2 IN 1" has been selected, the setting screen 63 for the eco-print setting which is the next specific item is subsequently displayed as shown in FIG. 11D. Here, the setting content "OFF" of the eco-print setting registered in the pre-registration information D10 is changed by the control portion 5 to the setting content "ON" which is a setting content within the range of the use authority of the user C. Thus, the setting screen 63 corresponding to the eco-print setting is displayed in a state where "ON" which is the setting content changed by the control portion 5 has been selected. Here, when the decision key 633 is operated by the user C in the state where the setting content "ON" has been selected, the setting content confirmation screen 64 is displayed as shown in FIG. 11E.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
   an authentication control portion configured to cause a user to log in accordance with a preset authentication operation;
   a selection portion configured to select pre-registration information in which a setting content of each of a plurality of setting items regarding a job is pre-registered, in accordance with a preset selection operation;
   an authority specification portion configured to specify a range of use authority that is preset so as to correspond to a non-login state and each user, in accordance with a current login state;
   a display control portion configured to display an authentication screen for performing the authentication operation if a number of specific items, of the plurality of the setting items, whose setting contents are outside the range of the use authority exceeds a threshold;

a change portion configured to change the setting content of the specific items to a content within the range of the use authority, if the number of the specific items is equal to or less than the threshold; and a setting screen display portion configured to display a setting screen for setting the specific items whose setting content has been changed by the change portion; wherein the display control portion is configured to display the authentication screen if the setting content of the specific items is set on the setting screen so as to be outside the range of the use authority.

2. The information processing apparatus according to claim 1, wherein the threshold is 1.

3. The information processing apparatus according to claim 1, wherein the threshold is at least 2, and the setting screen display portion sequentially displays a plurality of setting screens corresponding to a plurality of the specific items in a wizard format, which is an interactive format with the user, in accordance with setting operations on the setting screens.

4. The information processing apparatus according to claim 1, wherein the threshold is at least 2, and the setting screen display portion displays a plurality of setting screens corresponding to a plurality of the specific items on a plurality of split screens obtained by screen splitting.

5. The information processing apparatus according to claim 1, wherein the job includes an image reading process of reading image data from a document sheet, an image forming process of forming an image on the basis of image data, or a data transmission process of transmitting image data.

6. A job setting method comprising:

a first step of causing a user to log in accordance with a preset authentication operation;

a second step of selecting pre-registration information in which a setting content of each of a plurality of setting items regarding a job is pre-registered, in accordance with a preset selection operation;

a third step of specifying a range of use authority that is preset so as to correspond to a non-login state and each user, in accordance with a current login state;

a fourth step of displaying an authentication screen for performing the authentication operation, if a number of specific items, of the plurality of the setting items, whose setting contents are outside the range of the use authority exceeds a threshold;

a fifth step of changing the setting content of the specific items to a content within the range of the use authority, if the number of the specific items of the plurality of the setting items is equal to or less than the threshold;

a sixth step of displaying a setting screen for setting the specific items whose setting content has been changed in the fifth step; and a seventh step of displaying the authentication screen if the setting content of the specific items is set on the setting screen so as to be outside the range of the use authority.

* * * * *

UNITED STATES PATENT AND TRADEMARK OFFICE
CERTIFICATE OF CORRECTION

PATENT NO. : 9,111,210 B2
APPLICATION NO. : 14/470651
DATED : August 18, 2015
INVENTOR(S) : Hiroshi Furutani et al.

It is certified that error appears in the above-identified patent and that said Letters Patent is hereby corrected as shown below:

In the claims, column 16, line 55, insert --in--; and column 18, line 7, insert --in--

Signed and Sealed this
Twelfth Day of January, 2016

Michelle K. Lee
*Director of the United States Patent and Trademark Office*